United States Patent
Nazarov

(10) Patent No.: US 10,783,922 B2
(45) Date of Patent: *Sep. 22, 2020

(54) MOTOR SPIN UP WITH AUXILIARY POWER BOOST

(71) Applicant: Seagate Technology LLC, Cupertino, CA (US)

(72) Inventor: Alexey Nazarov, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,037

(22) Filed: Mar. 11, 2019

(65) Prior Publication Data

US 2019/0206436 A1 Jul. 4, 2019

Related U.S. Application Data

(63) Continuation of application No. 14/704,588, filed on May 5, 2015, now Pat. No. 10,229,710.

(51) Int. Cl.
*G11B 19/20* (2006.01)
*H02P 1/02* (2006.01)
*H02J 1/00* (2006.01)
*H02J 1/10* (2006.01)
*H02J 7/34* (2006.01)

(52) U.S. Cl.
CPC ............ *G11B 19/2054* (2013.01); *H02J 1/00* (2013.01); *H02J 1/108* (2013.01); *H02J 7/34* (2013.01); *H02P 1/028* (2013.01)

(58) Field of Classification Search
None
See application file for complete search history.

(56) References Cited

U.S. PATENT DOCUMENTS

| | | |
|---|---|---|
| 4,870,332 A | 9/1989 | Coghran et al. |
| 6,370,050 B1 | 4/2002 | Peng et al. |
| 6,455,953 B1 | 9/2002 | Lam |
| 6,970,319 B1 | 11/2005 | Bennett et al. |
| 7,177,222 B2 | 2/2007 | Spengler |
| 7,321,521 B2 | 1/2008 | Spengler |
| 7,493,500 B2 | 2/2009 | Chin et al. |
| 7,952,231 B1 | 5/2011 | Zansky et al. |
| 8,111,476 B2 | 2/2012 | Arizono et al. |
| RE44,009 E | 2/2013 | Spengler |
| 8,630,056 B1 | 1/2014 | Ong |
| 8,943,274 B2 | 1/2015 | Spengler |
| 10,229,710 B2 * | 3/2019 | Nazarov ............ G11B 19/2054 |
| 2002/0135333 A1 | 9/2002 | Heydt et al. |
| 2003/0169019 A1 | 9/2003 | Oosaki |

(Continued)

*Primary Examiner* — Tan X Dinh
(74) *Attorney, Agent, or Firm* — Hall Estill Attorneys at Law

(57) ABSTRACT

An apparatus and associated method that contemplate a data storage disc and a motor supporting the disc in rotation. Control circuitry operates to spin up the disc drive by accelerating the motor to a steady state speed by: beginning the spin up by energizing the motor with a primary power; comparing an amount of auxiliary power that is available from a battery to a predefined threshold; and before the motor is accelerated to the steady state speed and if the threshold comparison is favorable, then boosting the primary power by discharging the battery for a predetermined boost interval.

20 Claims, 9 Drawing Sheets

(56) References Cited

U.S. PATENT DOCUMENTS

| | | |
|---|---|---|
| 2004/0196586 A1 | 10/2004 | Winarski et al. |
| 2005/0141375 A1 | 6/2005 | Ehrlich et al. |
| 2006/0152085 A1 | 7/2006 | Flett et al. |
| 2011/0063750 A1 | 3/2011 | Kim et al. |
| 2011/0163701 A1* | 7/2011 | Carrier ................ H01M 2/1022 318/139 |
| 2011/0187314 A1 | 8/2011 | Kim |
| 2012/0011376 A1 | 1/2012 | Zai et al. |
| 2014/0354047 A1 | 12/2014 | Marovsky et al. |
| 2016/0322847 A1 | 11/2016 | Geiszler |
| 2019/0068106 A1* | 2/2019 | Kuroki ................ H02P 29/025 |

* cited by examiner

MOTOR SPIN UP WITH AUXILIARY POWER BOOST

RELATED APPLICATION

This is a continuation application claiming the benefit of priority to U.S. non-provisional application Ser. No. 14/704,588, which issues as U.S. Pat. No. 10,229,710 on Mar. 12, 2019.

SUMMARY

Some embodiments of the present technology contemplate an apparatus having a data storage disc and a motor supporting the disc in rotation. Control circuitry operates to spin up the disc drive by accelerating the motor to a steady state speed by: beginning the spin up by energizing the motor with a primary power; comparing an amount of auxiliary power that is available from a battery to a predefined threshold; and before the motor is accelerated to the steady state speed and if the threshold comparison is favorable, then boosting the primary power by discharging the battery for a predetermined boost interval.

Some embodiments of the present technology contemplate an apparatus having a battery, a data storage disc, and a motor supporting the disc in rotation. Control circuitry operates to compare an amount of auxiliary power that is available from the battery to a predefined threshold, and if the threshold comparison is favorable then boost a primary power to the motor by discharging the battery for a predetermined boost interval.

Some embodiments of this technology contemplate a method characterized by steps of: obtaining a data storage device having a battery, a data storage disc, and a motor operably supporting the disc in rotation; accelerating the motor to a predetermined steady state speed; comparing an amount of auxiliary power that is available from the battery to a predefined threshold; and if the comparing step satisfies the threshold requirement, then during the accelerating step boosting a primary power to the motor by discharging the battery.

DETAILED DESCRIPTION

Initially, it is to be appreciated that this disclosure is by way of example only, not by limitation. The power concepts herein are not limited to use or application with any specific system or method. Thus, although the instrumentalities described herein are for the convenience of explanation, shown and described with respect to exemplary embodiments, it will be appreciated that the principles herein may be applied equally in other types of systems and methods involving spinning up an electric motor.

The present disclosure generally relates to the design and control of electronic circuitry that is employed to spin up a motor. By "spin up" it is meant the process of starting the motor from rest or from a reduced speed and accelerating it to an operational, steady state speed. The interval of time necessary to spin up the motor is referred to herein as the time to ready (TTR). A primary power supply is boosted by inclusion of an auxiliary power to shorten the TTR.

Embodiments of the technology are described herein as practically applied to spinning up a motor in a disc drive data storage device, although the contemplated embodiments are not so limited. In equivalent alternative embodiments the motor can be something other than a disc drive motor. From reading the disclosure herein of the illustrative embodiments, the skilled artisan does not need an enumeration of all types of motor systems that are suited for using this technology in order to understand the scope of the claimed subject matter, and so no such enumeration is attempted.

Figure 1:
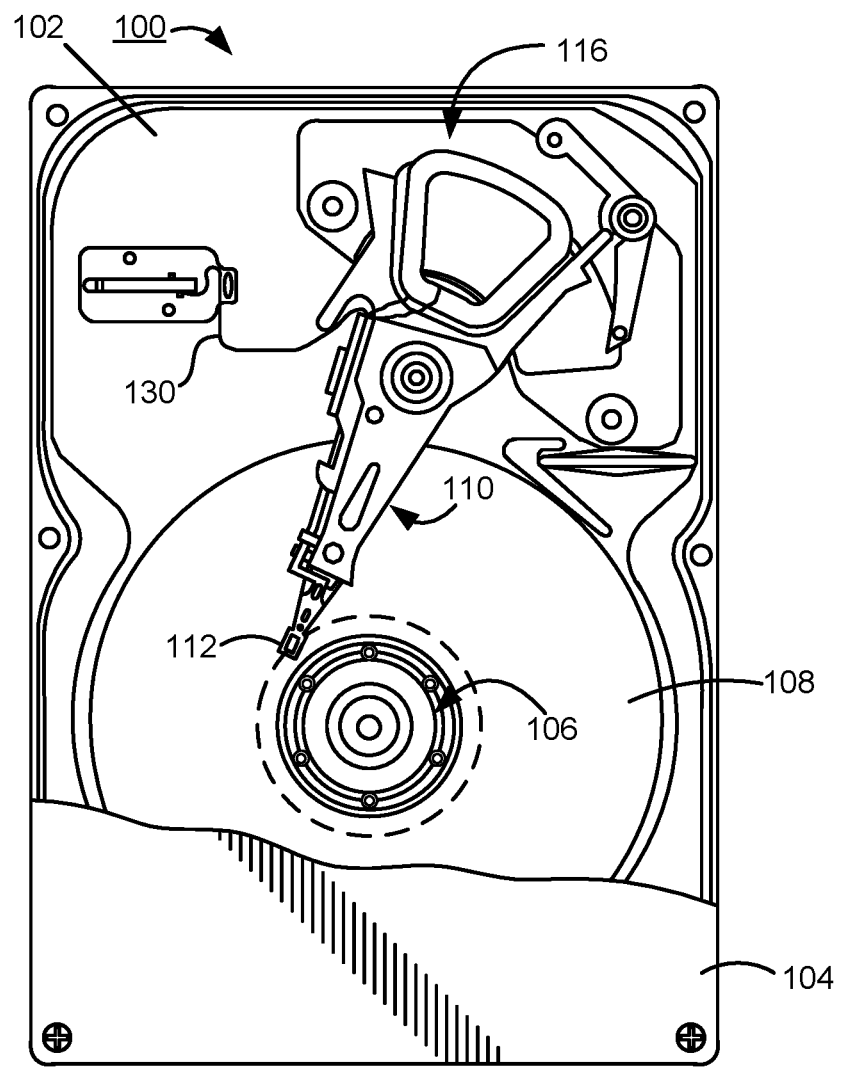
FIG. 1 depicts a plan view of a disc drive data storage device that is constructed in accordance with embodiments of the present technology.

For purposes of these illustrative embodiments, FIG. 1 provides a top plan view of a data storage device in the form of a disc drive 100 that is constructed in accordance with illustrative embodiments of the present technology. A base deck 102 and a top cover 104 (shown in partial cutaway) cooperate to form a sealed housing for the disc drive 100. A spindle motor 106 rotates one or more magnetic recording discs 108. An actuator assembly 110 supports an array of read/write heads 112 adjacent the respective disc surfaces. The actuator assembly 110 is rotated through the application of current to a voice coil motor (VCM) 116.

The spindle motor 106 in a high capacity disc drive 100 rotates a stack of discs 108. The additional mass of six discs 108, for example, requires more electrical energy to spin up in the same TTR in comparison to another disc drive 100 having only one disc 108. However, cost constraints and power budgets prevent outright sizing the motor and/or power supply large enough to equalize the TTR performance of low and high capacity disc drives 100. However, reducing the TTR in high capacity disc drives 100 would be advantageous in providing faster data access to the end-user. It is to technological solutions of that problem that the embodiments of this technology are directed.

Figure 2:
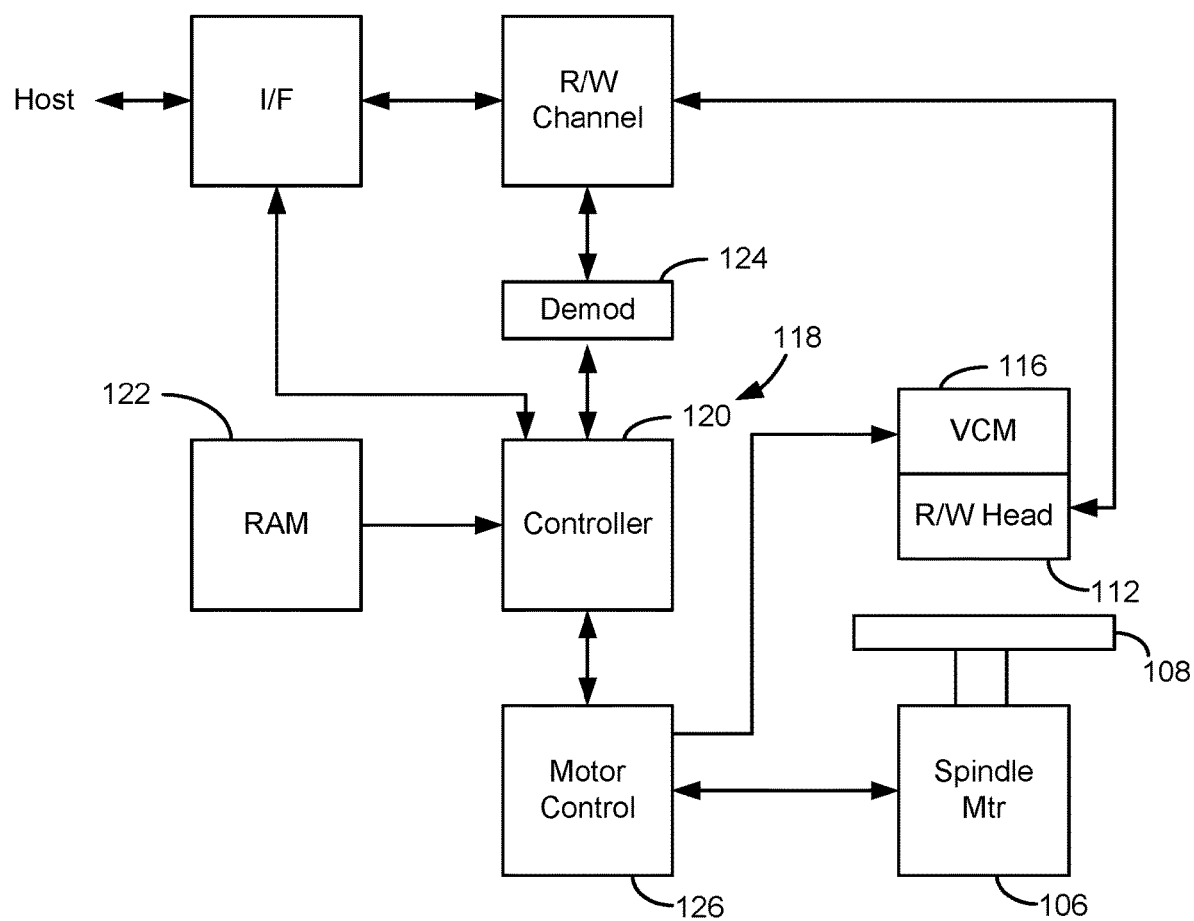
FIG. 2 depicts a block diagram of the control system in the disc drive of FIG. 1.

FIG. 2 is a block depiction of relevant portions of a control circuit controlling operation of the disc drive 100 of FIG. 1. Position-controlling of the read/write head(s) 112 is provided by a servo control circuit 118 that is programmed with computer code to form a servo control loop. The servo control circuit 118 generally includes a controller 120, a memory such as the random access memory (RAM) 122 depicted, a demodulator (DEMOD) 124, and a motor control circuit 126. Certain details are known to the skilled artisan and thus not depicted. For example, typically the controller 120 can include a general purpose processor in conjunction with an application specific integrated circuit (ASIC) hardware-based servo controller.

Figure 3:
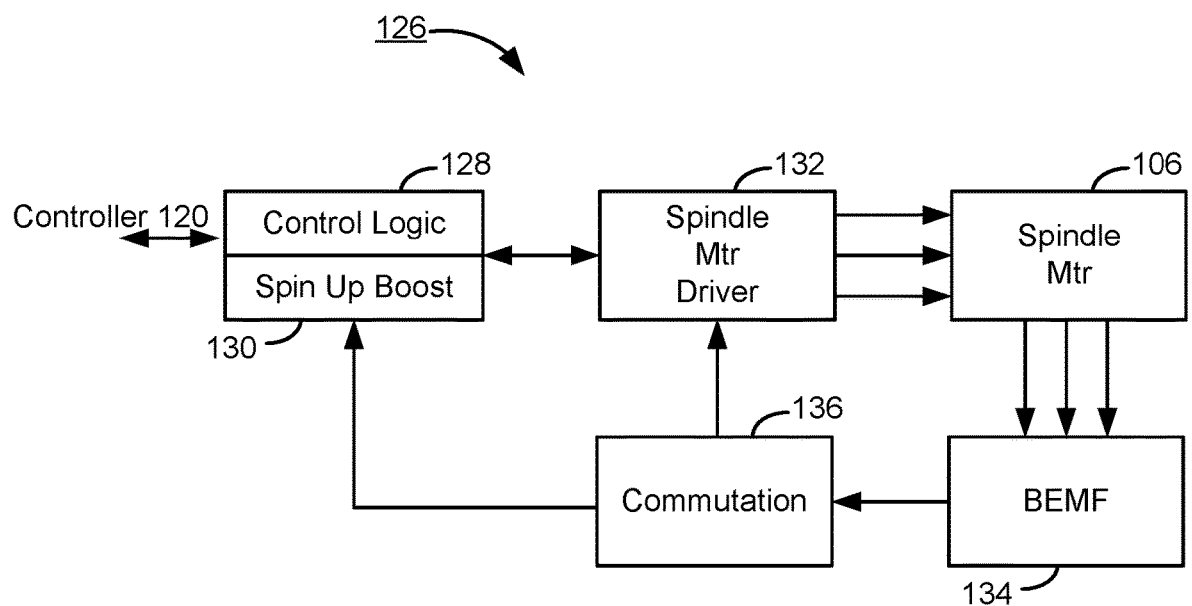
FIG. 3 depicts a block diagram of the motor control circuitry in the control system of FIG. 2.

FIG. 3 is a block depiction of relevant portions of the motor control circuitry 126 of FIG. 2. Control logic 128 receives commands from, and outputs state data to, the controller 120, and controls operation of the motor 106 during transitional operations (referred to as spin up and spin down) and steady-state operations. The control logic 128 includes spin up boost logic 130 that operably decreases the motor 106's spin up cycle time (TTR) in accordance with this technology. Spindle driver circuitry 132 applies drive currents to the phases of the spindle motor 106 over a number of sequential commutation steps to rotate the motor 106. During each commutation step, current is applied to one phase, sunk from another phase, and a third phase is held at a high impedance in an unenergized state. Back electromagnetic force (bemf) detection circuitry 134 measures the bemf generated on the unenergized phase, compares this voltage to the voltage at a center tap, and outputs a zero crossing (ZX) signal when the bemf voltage changes polarity with respect to the voltage at the center tap. A commutation circuit 136 uses the ZX signals to generate and output commutation timing (CT) signals to time the application of the next commutation step.

Figure 4:
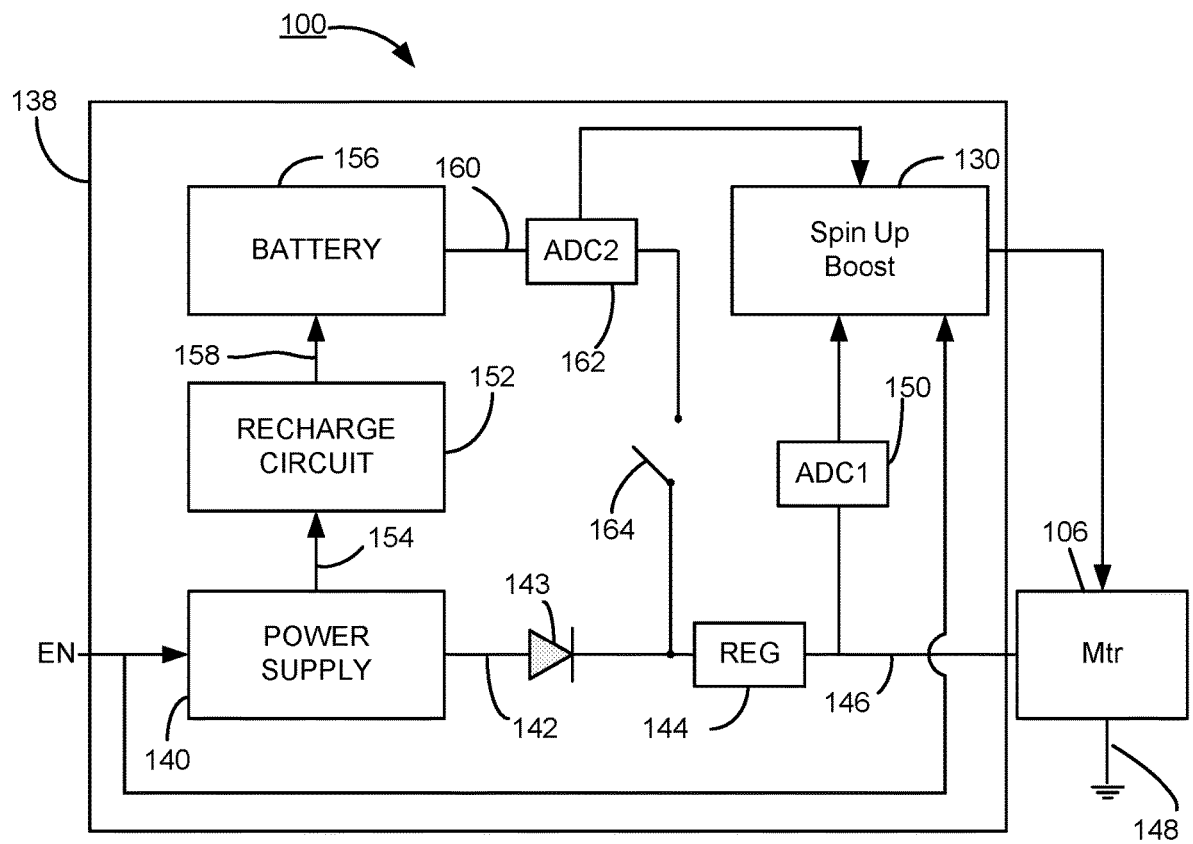
FIG. 4 depicts a block diagram of the power boosting circuitry in the disc drive of FIG. 1.

FIG. 4 is a block depiction more particularly detailing implementation of the reduced TTR of this technology. In these illustrative embodiments the components reside within the disc drive 100, interconnected via its printed circuit board assembly (PCBA) 138. However, the contemplated embodiments are not so limited. In alternative embodiments discussed below some of the components and circuitry can reside outside the disc drive 100, between it and the external source of power.

A power supply 140 operably receives input alternating current (AC) power from the source of power (not shown) and outputs various associated direct current (DC) voltages on different supply paths, such as the path 142. For the sake of an illustrative description entirely, without limitation, the output voltage from the power supply 140, herein referred to as the "supply power," can be provided at a nominal value such as twelve volts (12V). This supply power is supplied through protection diode 143 to a regulator 144 which applies voltage regulation to provide an output regulated voltage to path 146. The regulated voltage passes to the motor 106, a ground connection 148 denoting the completion of this primary supply power loop. An analog to digital converter ("ADC") 150 provides to the spin up boost logic 130 a digital indication of the supply power. For example, without limitation, the ADC 150 can include an ammeter informing the spin up boost logic 130 of the amount of current supplied to the motor 106.

A recharge circuit 152 receives input voltage from the power supply 140 via path 154 to selectively apply recharging current to a rechargeable battery 156, via path 158. For purposes of this description and meaning of the claims, a "rechargeable battery" or "battery" herein means a type of electrical battery that stores energy through a reversible electrochemical reaction and can be electrically charged, discharged to an electrical load, and then recharged, many times over. Several different combinations of electrode materials and electrolytes are suitable for constructing the rechargeable battery in this technology, including but not limited to at least nickel metal hydride, lithium ion, lithium ion polymer, and the like. The battery 156 is selectively used to supplement the primary power to the motor 106 with an auxiliary power boost for a predetermined time during spin up of the motor 106.

The battery 156 supplies the auxiliary power on path 160. Another ADC 162 provides to the spin up boost logic 130 a digital indication of the available auxiliary power (depending on the present charge state of the battery 156). For example, without limitation, the ADC 162 can include an ammeter informing the spin up boost logic 130 of the amount of current that is discharged from the battery 156. During normal operation, path 160 is preferably decoupled from path 142 (i.e., spin up boost logic 130 opens switching element 164) so that the regulator 144 receives power from only the power supply 140. The switching element 164 can be constructed of a suitable transistor, one or more protection diodes, etc., as desired.

Figure 5:
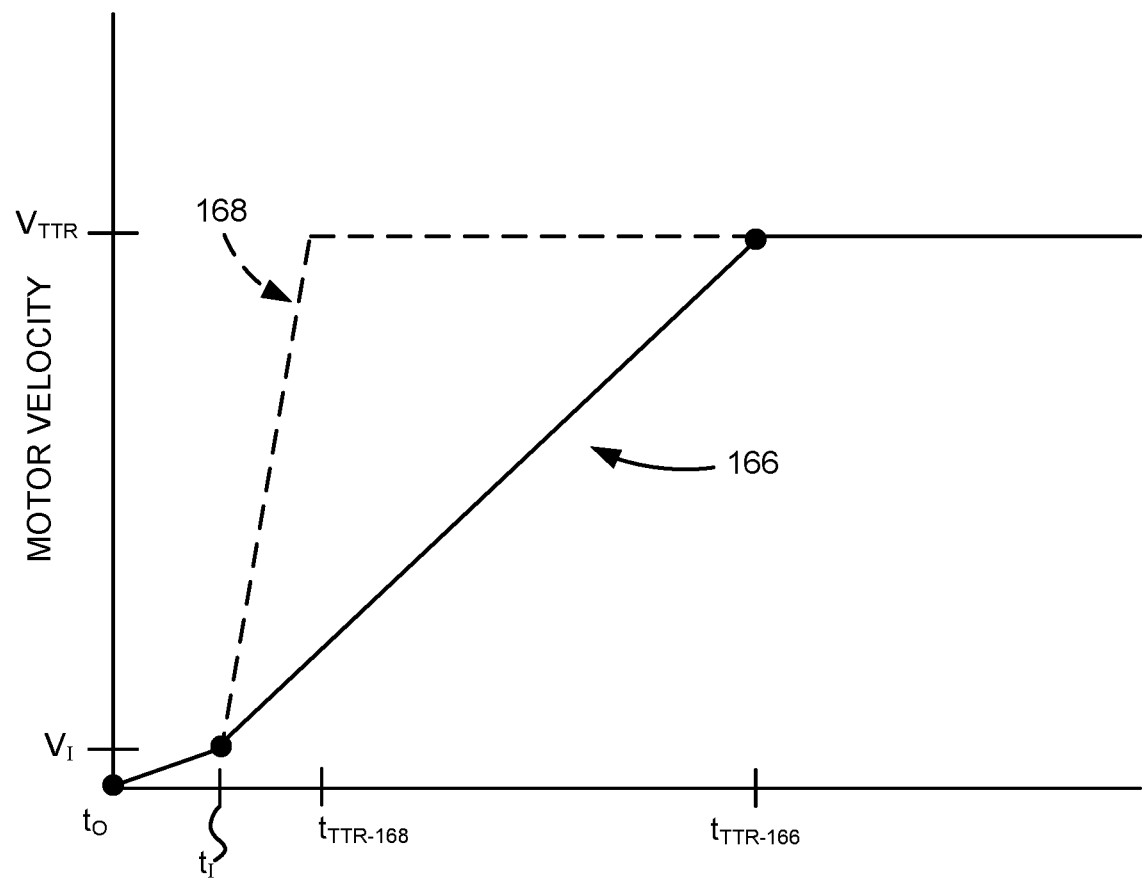
FIG. 5 depicts a graphical comparison of a spin up using the boost power of this technology to a spin up not using the boost power of this technology.

FIG. 5 graphically depicts a typical spin up velocity curve 166 for the motor 106, from a zero velocity at time $t_0$ to a steady state velocity at time $t_{TTR}$ ("Time to Ready"). The curve 166 has an initial trajectory during open loop acceleration from $t_0$ to an intermediate velocity $V_I$ at time $t_I$, and then another trajectory during closed loop acceleration from $t_I$ to the $t_{TTR}$. Both trajectories in these illustrative embodiments are linear, although the contemplated embodiments are not so limited in that they can be partially or entirely nonlinear.

Figure 6:
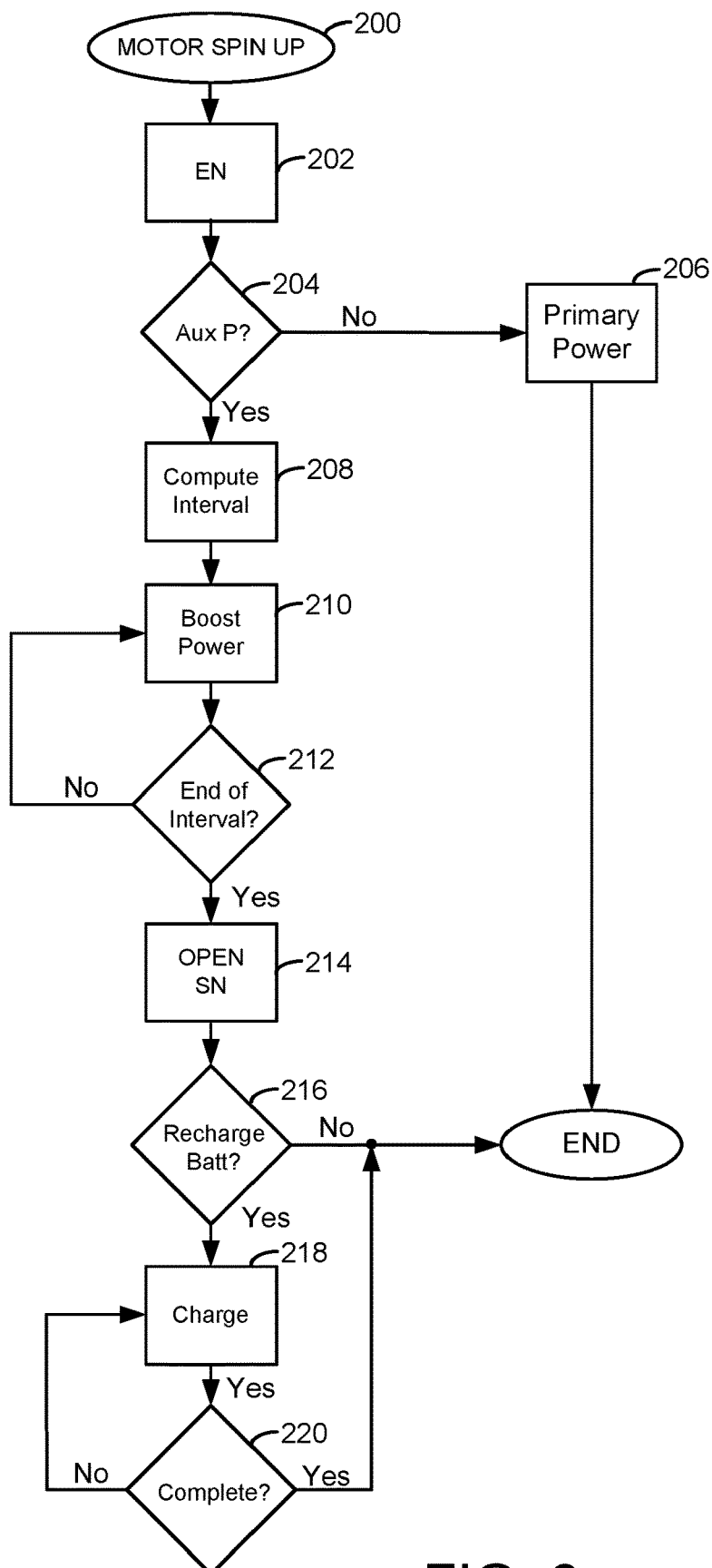
FIG. 6 depicts a flowchart of steps in a method for MOTOR SPIN UP in accordance with embodiments of this technology.

FIG. 6 depicts a graphical comparison of a spin up velocity curve 168 of this technology to a spin up velocity curve 166 of disc drive not using the boost power of this technology. The velocity curves are plotted from a zero velocity at time $t_0$ to a steady state velocity at time $t_{TTR}$ ("time to ready"). The curves 166, 168 have an initial trajectory during open loop acceleration from $t_I$ to an intermediate velocity $V_I$ at time $t_1$. In these illustrative embodiments the curves 166, 168 have different trajectories during closed loop acceleration from $t_I$ to the corresponding $t_{TTR}$. Both trajectories in these illustrative embodiments are linear, although the contemplated embodiments are not so limited in that they can be partially or entirely nonlinear.

Curve 168 depicts at time $t_I$ the spin up boost logic 130 (FIG. 4) can close the switching element 164 to boost the power from the power supply 140 by the inclusion of the auxiliary power from the battery 156. The increased trajectory of the curve 168 results in a significantly reduced time required to reach the $V_{TTR}$. In alternative embodiments (not depicted) the spin up boost logic 130 can close the switching element 164 at time $t_0$ to boost the power to the motor 106 substantially simultaneously to the initial open loop acceleration of the motor 106.

FIG. 6 is a flowchart depicting steps in a method 200 for MOTOR SPIN UP performed by computer execution of boost spin up logic (such as 130) in accordance with illustrative embodiments of the present invention. The method begins in block 202 with the controller (such as 120 depicted in FIG. 2) detecting a device enable ("EN") signal from the host device. The EN signal is employed in these illustrative embodiments to spin up the motor (such as 106) to the steady state speed, at a time when the power to the motor has been reduced or shut off during reduced activity or inactivity.

In block 204 the spin up boost logic determines whether the battery (such as 156) is presently storing enough power to provide the boost of start up power needed to significantly reduce the TTR. For example, without limitation, during reduction to practice it was empirically determined that reducing the TTR required boosting the supply power with an auxiliary power (from the battery) of two amperes at twelve volts and for eight seconds. The energy required from the auxiliary power is:

$$E = 2 \text{ amps} * 12 \text{ volts} * 8 \text{ seconds} = 53 \text{mAh}$$

If the battery has been used repeatedly in numerous spin up cycles and not yet recharged, then the determination of block 204 can be "no." In that case, control passes to block 206 where the disc drive 100 spins up the motor with only the primary supply power, forgoing the reduced TTR benefits of this technology. If, contrarily, the determination of block 206 is "yes," then in block 208 the spin up boost logic computes a boost interval during which the switching element 164 is to be closed in order to provide the desired boost during the spin up. In some embodiments the boost interval can be a predetermined interval of elapsed time. For example, the spin up boost logic can define the interval as beginning at the intermediate interval of time $t_I$ and last for a duration of the eight seconds used in the example above. Alternatively, the spin up boost logic can define the boost interval in terms of a voltage drop from an initial voltage of the battery at the beginning of the interval to a predetermined reduced voltage.

After the boost interval is predefined, and at the beginning of the predefined boost interval, in block 210 the spin up boost logic closes the switching element to begin boosting the spin up power. In block 212 it is determined whether the boost interval is completed. If the determination of block 212 is "yes," then in block 214 the spin up boost logic opens the switching element to end boosting the spin up power.

In block 216 it is determined whether to recharge the battery or not. First, that determination is delayed until a predetermined time has elapsed after the switching element is opened in block 214. For example, the spin up boost logic can proceed in response to a timer that is started in conjunction with actuation of the switching element in block 210. The timer can start with the closing of the switching element at the beginning of the boosting, or the timer can start with the opening of the switching element at the end of the boosting. For another example, the spin up boost logic can proceed in response to the power (in terms of current) to the motor dropping below a predetermined value after the boosting is ended. In either case, the momentary delay before recharging, when recharging occurs, ensures not overloading the external power supply by the boosting and recharging duties.

After the delay, the spin up boost logic then determines if the battery has been sufficiently discharged to warrant a call to the recharge circuit (such as 152) to begin recharging the battery to a maximum power. That determination can be based on a comparison of the battery's stored energy to a preselected threshold value, such as 80% of battery capacity. If the determination of block 216 is "yes," then the battery is recharged to completion in blocks 218, 220.

Figure 7:
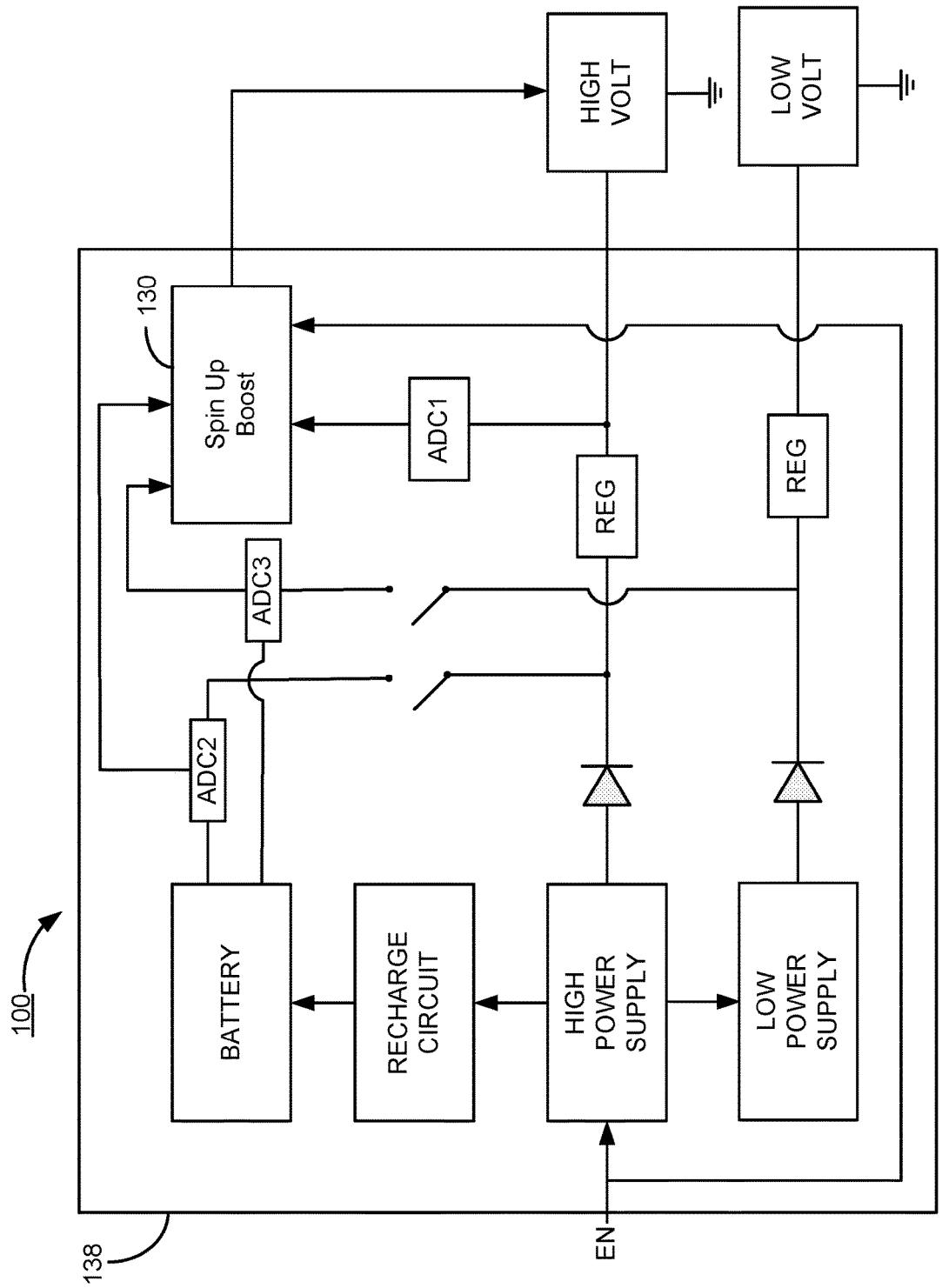
FIG. 7 depicts a block diagram of alternative embodiments of the power boosting circuitry of FIG. 4.

The embodiments depicted in FIG. 4 describe only one 12V power channel for powering the high voltage components, such as the motor 106, although the contemplated embodiments are not so limited. FIG. 7 depicts alternative embodiments in which the disc drive 100 also has a reduced voltage (such as 5V) power channel for powering low voltage components, such as the control electronics. In a similar fashion described above, the battery and associated circuitry is configured to share the battery's auxiliary power with each of the power channels. Alternatively, each power channel can be provided with a dedicated battery. The spin up boost logic 130 individually controls a switching element for each power channel so that boosting the primary power in one of the power channels can be done independently of boosting the primary power in the other power channel.

Furthermore, although the illustrative embodiments emphasize the use of primary and auxiliary power to energize just the motor 106, the contemplated embodiments are not so limited. The embodiments of this technology contemplate circuitries providing the primary and auxiliary power to service the entire electrical requirements (high voltage and low voltage requirements) of the disc drive 100.

Figure 8:
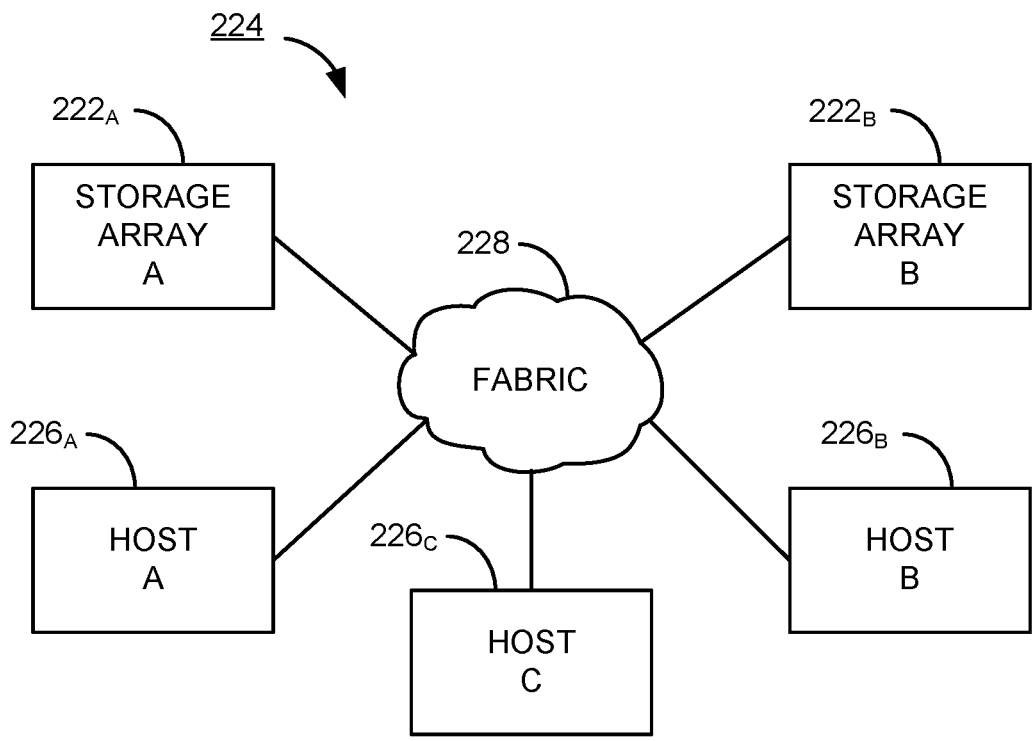
FIG. 8 depicts a block diagram of alternative embodiments in which the disc drive of FIG. 1 is included in a storage array within a wide area network computer system.

The embodiments discussed so far are related to the battery and associated circuitry residing within the disc drive 100; in alternative embodiments they can reside outside the disc drive 100. For example, FIG. 8 depicts pluralities of the disc drives 100 employed to form storage arrays $222_A$, $222_B$ in a computer-based system 224 characterized as a wide area network (WAN). The system 224 includes a number of host computers 226, respectively identified as hosts A, B and C. The host computers 226 interact with each other as well as with the data storage arrays $222_A$, $222_B$ via a fabric 228. The fabric 228 is preferably characterized as a fibre-channel based switching network, although other configurations can be utilized as well including the Internet. It is contemplated that the host computer $226_A$ and the data storage array $222_A$ are physically located at a first site, the host computer $226_B$ and the storage array $222_B$ are physically located at a second site, and the host computer $226_C$ is at yet a third site, although such is merely illustrative and not limiting.

Figure 9:
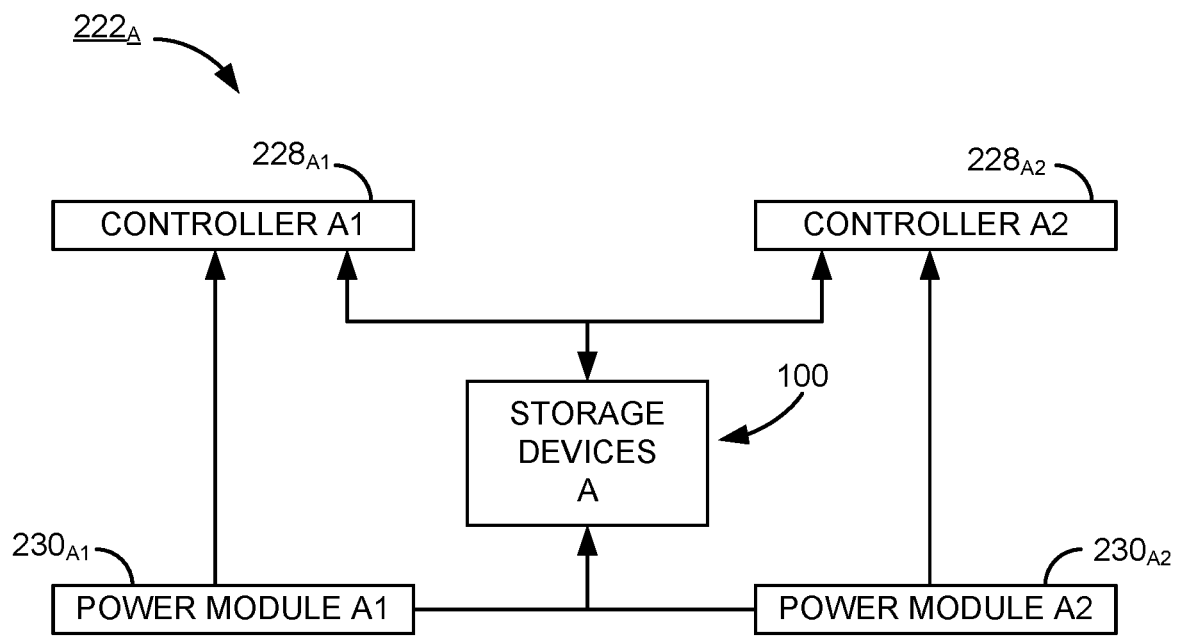
FIG. 9 depicts a block diagram of the storage array of FIG. 8.
Figure 10:
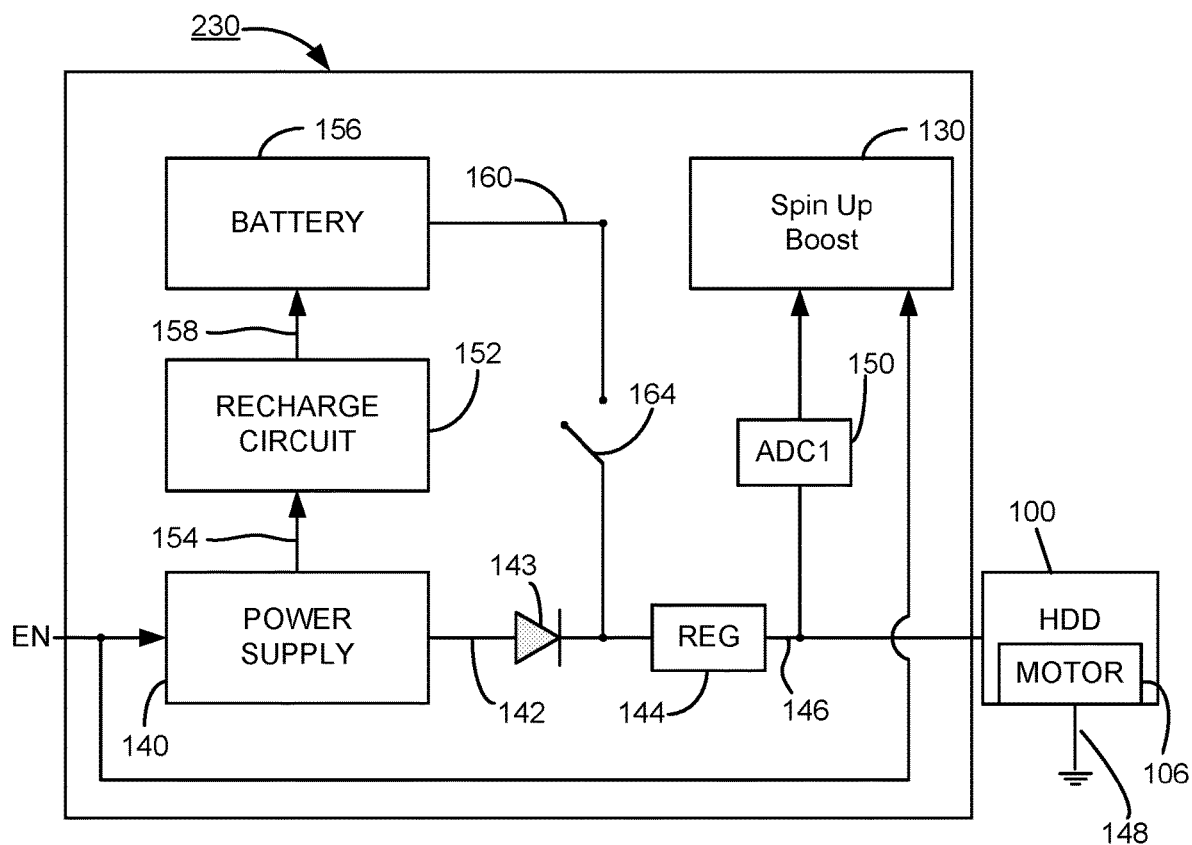
FIG. 10 depicts a block diagram of alternative embodiments in which the power boost circuitry resides externally to the disc drive.

As shown in FIG. 9, the storage array $222_A$ can include a pair of controllers $228_{A1}$, $228_{A2}$ and an array of the data storage devices 100. The controllers 228 and data storage devices 100 preferably utilize a fault tolerant arrangement so that the various controllers 228 utilize parallel, redundant links and at least some of the user data stored by the system 222 is mirrored, either within the same storage array 222 or distributed among different storage arrays 222. Each array 222 further includes a pair of power modules $230_{A1}$, $230_{A2}$ that supply electrical power to the controllers 228 and the data storage devices 100. The power modules 230 are preferably configured to operate in tandem so that during normal operation the power module $230_{A1}$ supplies power to the controller $228_{A1}$ and to half of the data storage devices 100, and the power module $230_{A2}$ supplies power to the controller $228_{A2}$ and to the other half of the data storage devices 100. Each power module 230 can further be sized and configured to be able to individually supply all of the power for the array 222 should the other power module 230 become inoperative. FIG. 10 depicts relevant portions of one of the power modules 230 of FIG. 10 in accordance with these alternative embodiments of the present invention. The components in the power module 230 are similar to the embodiments of FIG. 4 described above, and as such retain like reference numbers here where they reside outside the disc drive 100 between it and the external source of supply power (not depicted).

In yet other embodiments of this technology the components in FIG. 10 (battery, recharging module, circuitry) can be constructed to reside in a portable module that is removably pluggable into a device. For example, without limitation, the portable module can be pluggable into a communications port in the power module 230, in the disc drive 100, or in the interconnecting power cabling and/or adapter between the power module 230 and the disc drive 100. For example, the portable module can provide the boosted TTR advantages of this technology to an existing product by plugging into the system by the product's universal serial bus (USB) port.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. In addition, although the embodiments described herein are directed to data storage devices, it will be appreciated by those skilled in the art that the claimed subject matter is not so limited and various other systems that spin up a motor can utilize the embodiments of this technology without departing from the spirit and scope of the claimed invention.

What is claimed:

1. An apparatus, comprising:
    a disc drive having a data storage disc; and a motor supporting the disc in rotation;
    control circuitry operable to spin up the disc drive by accelerating the motor to a steady state speed by:
        beginning the spin up by energizing the motor with only a primary power which relates to a corresponding non-boosted spin up time to ready ("TTR") interval of time necessary for the motor to accelerate to the steady state speed;
        before the motor is accelerated to the steady state speed, comparing an amount of auxiliary power that is available from a battery to a predefined amount of auxiliary power that, when used to boost the primary power, relates to a corresponding boosted spin up TTR interval of time that is less than the non-boosted TTR; and
        before the motor is accelerated to the steady state speed and if the battery has at least the predefined amount auxiliary power corresponding to the boosted spin up TTR that is less than the non-boosted TTR, then boosting the primary power by discharging the battery for a predetermined boost interval.

2. The apparatus of claim 1 further comprising spin up boost logic computer instructions configured to control the control circuitry and residing in the disc drive.

3. The apparatus of claim 1 2 comprising a plurality of disc drives contained in a storage array.

4. The apparatus of claim 3 further comprising spin up boost logic computer instructions configured to control the control circuitry and residing in the storage array externally to the plurality of disc drives.

5. The apparatus of claim 4 further comprising an ammeter that informs the controller of the amount of current that is discharged from the battery.

6. An apparatus, comprising:
    a battery;
    a data storage disc;
    a motor supporting the disc in rotation; and
    control circuitry operable to compare an amount of auxiliary power that is available from the battery to a predefined amount of auxiliary power that, when used to boost a primary power to the motor, relates to a corresponding boosted TTR interval of time that is less than a non-boosted TTR interval of time corresponding to energizing the motor with only the primary power, and if the battery has at least the predefined amount of auxiliary power corresponding to the boosted TTR that is less than the non-boosted TTR then boost the primary power to the motor by discharging the battery for a predetermined boost interval.

7. The apparatus of claim 6 wherein the battery and the control circuitry reside in a portable module that is removably pluggable into a communications port of a device selected from the group consisting of a disc drive, an external power module, and a power transmission device between the disc drive and the external power module.

8. The apparatus of claim 6 further comprising a charger for selectively recharging the discharged battery.

9. The apparatus of claim 6 wherein the control circuitry comprises a processor-based controller configured to activate a switching element to combine the primary power and the battery power.

10. The apparatus of claim 9 wherein the controller activates the switching element to decouple the battery power from the primary power during at least a portion of the spin up.

11. The apparatus of claim 9 wherein the controller activates the switching element to decouple the battery power from the primary power when the primary power is removed from the motor.

12. The apparatus of claim 6 wherein the control circuitry comprises a plurality of power channels and is operable to individually boost a power to each of the power channels.

13. The apparatus of claim 12 wherein the apparatus is a disc drive and the power channels collectively supply the entire electrical requirements for the disc drive.

14. A method, comprising:
    obtaining a data storage device having a battery, a data storage disc, and a motor operably supporting the disc in rotation;
    beginning to accelerate the motor to a predetermined steady state speed by energizing the motor with only a primary power which relates to a corresponding non-boosted spin up time to ready ("TTR") interval of time necessary for the motor to accelerate to the steady state speed;
    comparing an amount of auxiliary power that is available from the battery to a predefined amount of auxiliary power that, when used to boost the primary power, relates to a corresponding boosted spin up TTR that is less than the non-boosted TTR; and
    if the comparing step indicates the battery has at least the predefined amount of auxiliary power corresponding to the boosted spin up TTR that is less than the non-boosted TTR, then during the accelerating step boosting the primary power to the motor by discharging the battery.

15. The method of claim 14 wherein the battery is a rechargeable battery and further comprising charging the battery after the boosting step.

16. The method of claim 15 wherein the charging step comprises delaying the charging step after the boosting step is completed for a predetermined interval of time.

17. The method of claim 14 wherein the accelerating step and the boosting step begin simultaneously.

18. The method of claim 14 wherein the boosting step comprises discharging the battery in relation to a predetermined value of an operational parameter.

19. The method of claim 18 wherein the boosting step comprises discharging the battery in relation to a predetermined elapsed time.

20. The method of claim 18 wherein the boosting step comprises discharging the battery in relation to a predetermined voltage drop of the battery.

* * * * *